3,514,736
THERMOSTATIC CONTROL AND SAFETY CONTROL COMBINATION

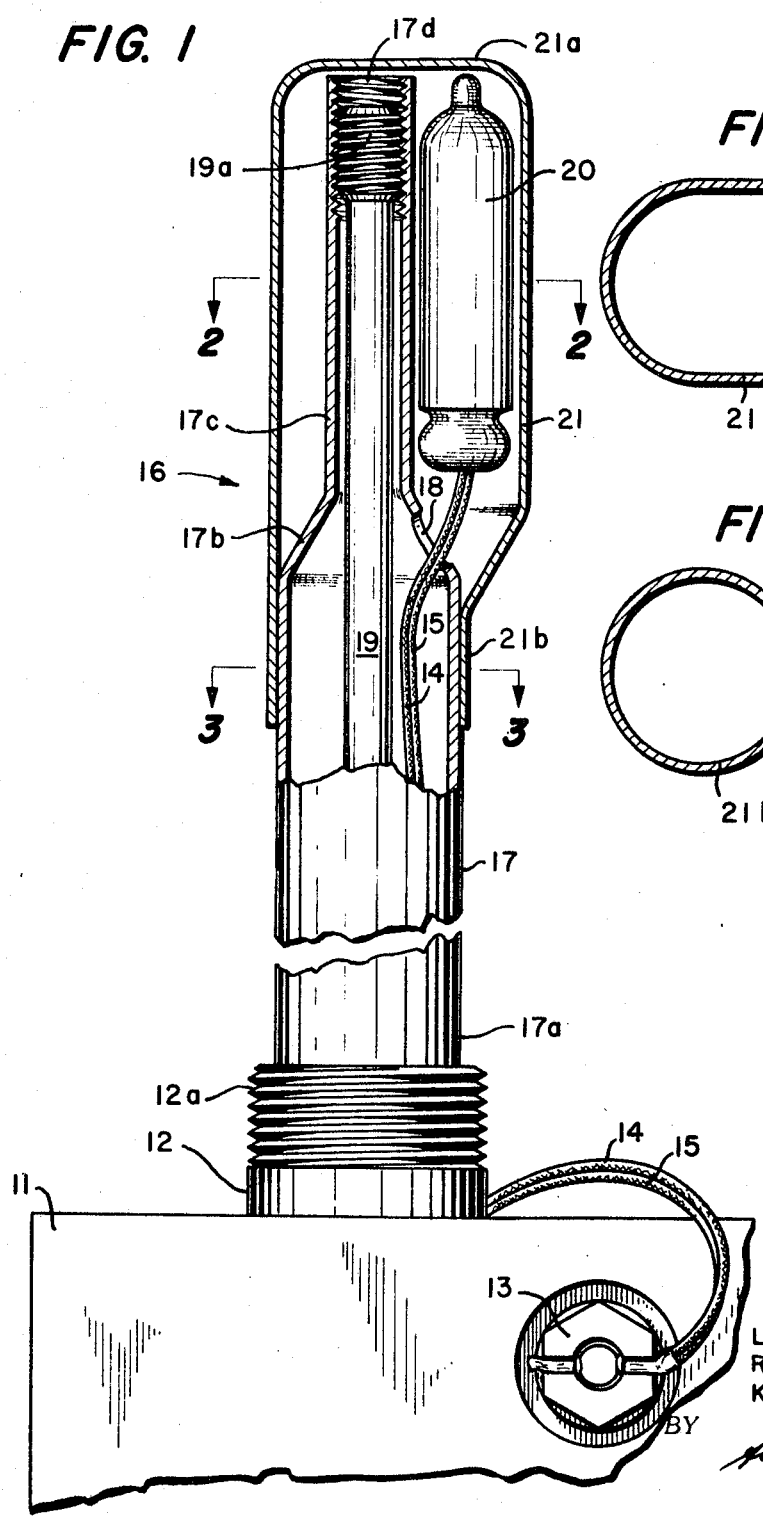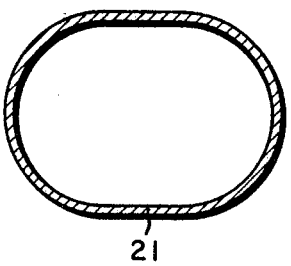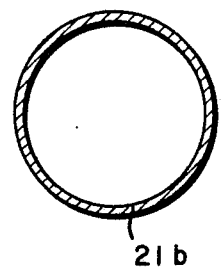

Kyung C. Synn, Compton, Robert A. Rountry, Canoga Park, and Louis L. Mucciante, Cerriots, Calif., assignors to Honeywell Inc., Minnneapolis, Minn., a corporation of Delaware
Filed Dec. 20, 1968, Ser. No. 785,684
Int. Cl. H01h *37/46, 37/48;* A21b *1/40*
U.S. Cl. 337—394  9 Claims

ABSTRACT OF THE DISCLOSURE

A rod and tube thermostatic control and a thermocouple powered high limit safety control combination, for water heaters and the like, wherein a normally closed thermostatic high limit switch is positioned within a cap that encloses and seals the threaded connection between the rod and tube and also encloses an opening in the tube through which a lead wire or two extends from the switch to the thermocouple powered safety control.

THERMOSTATIC CONTROL AND SAFETY CONTROL COMBINATION

The art in which the present invention lies is a highly developed one. There are numerous arrangements which are directed to the same general problems as this invention, but differ structurally and functionally from the present invention although the same end result is obtained. All are concerned with providing a combination control device that will control gas flow to maintain a uniform or controlled water temperature in a tank and to shut off the gas to a main burner that heats the water if the water gets unsafely hot or the pilot burner goes out and, therefore, cannot ignite gas for the main burner.

SUMMARY OF THE INVENTION

Rod and tube actuator means for a control, a thermostatic switch having a lead wire extending through an opening in the tube, and a cap enclosing the end of the tube, the switch and the opening and engaging the periphery of the tube to provide a fluid seal for said opening and the connection between the rod and tube.

FIG. 1 is a fragmentary view of the invention with portions thereof broken away and portions shown in cross-section;

FIG. 2 is a cross-section of the cap or tubular member forming a part of the invention and taken along line 2—2 of FIG. 1;

FIG. 3 is a cross-section of the cap portion of the invention, taken along line 3—3 of FIG. 1.

The reference numeral 11 designates a schematically shown housing or body for the control elements therein, the details of which form no part of the invention. Extending from one wall of the housing is a threaded shank 12 which is adapted to be screw threaded into a threaded opening in a water tank (not shown). The reference numeral 13 designates a conventional thermocouple energized power unit for controlling the operation of a safety control, either a valve or a switch, both of which are also conventional. Lead wires 14 and 15 extend from the power unit through an aperture (not shown) in the shank 12 and from the shank into a rod and tube assembly, generally designated by reference numeral 16, in which the invention lies.

The rod and tube assembly comprises a tube 17 having a large diameter portion 17a, a beveled portion 17b and a smaller diameter portion 17c. The portion 17a is externally threaded (not shown) but may be otherwise secured to the shank 12 and is preferably round in cross-section, as illustrated in FIG. 3 of the drawing. The portion 17b, intermediate the ends of the tube, has an opening 18 therethrough, through which the leads 14 and 15 from the power unit extend. The portion 17c is internally threaded at its outer end for adjustably receiving a cooperating rod 19. The tube 17 is preferably made of copper or some other material having a high temperature coefficient of expansion while the rod 19 is made of Invar or some other material having a low temperature coefficient of expansion. The rod 19 has a slightly enlarged end portion 19a that is threaded for screw-thread engagement with the threads 17d in the tube portion 17c. The inner end of the rod 19 (not shown) is positioned to engage a suitable control device, such as a valve or switch, to control the flow of gas to the heating means for the tank.

Positioned alongside the portion 17c of the tube, is a temperature responsive switch 20 the details of which form no part of this invention. Suffice it to say that within the switch 20 are a pair of contacts which will be actuated upon sensing a predetermined high temperature, for example 200° F. These two contacts are suitably connected to the leads 14 and 15.

Enclosing the portion 17c of the tube 17 and the switch 20, is a cap or tubular member 21 which is generally oval in shape near one end thereof, has a closed end 21a, and is generally round in cross-section near its other end 21b, as illustrated in FIG. 3. The cap is preferably made of copper but may also be made of some other suitable material. The round portion 21b encircles the tube 17 so as to have the opening 18 and the connection 19a, 17d between the rod 19 and tube 17 sealed against leakage of water into the tube. This may be accomplished by either a soldering or a welding operation.

The rod and tube are assembled by inserting the inner and threaded end of the rod through the threaded end of the tube and screw-threading the threaded end of the rod into the threaded end of the tube. The switch and cap are assembled on the rod and tube by first placing the switch in the cap, threading the leads 14 and 15 through the opening 18 and the portion 17a of the tube then sliding the switch and cap over portion 17c of the tube, either placing the end 21a against or very close to the adjacent end of the tube portion 17c and placing the portion 21b on portion 17a, so as to not materially increase the overall length of the rod and tube. With the cap thus positioned, the soldering or welding operation may be performed to secure the cap portion 21b on the tube. The entire assembly may then be screw-threaded or otherwise secured in the shank 12 of the housing 11 of the combined control and the leads 14 and 15 connected to the power unit in any suitable manner.

In operation of the device, with the rod and tube located in the water within a hot water tank and the combination control suitably connected to the heating means for the water in the tank, the rod and tube will function to control the supply of heat to the water when the water is below a predetermined temperature and to cut off the supply of the heating medium when the water reaches a predetermined temperature. Should the water temperature rise to an unsafe level, such as 200° F., the switch 20 will function to open the circuit to the safety control and cause safety shutdown. The safety unit is preferably one of the safe-lighting, manual-reset type of a well known construction. This means that following a safety shutdown the combination control may not be placed into operation again until the unsafe condition has disappeared and the system again placed in operation manually, in a conventional manner.

Obviously, the invention could be used to operate controls for electric current in an electric water heater installation by the substitution of suitable switches for the corresponding gas controls. Therefore, the scope of the invention is to be determined from the appended claims.

The embodiments of the invention in which an exclusive property or right is claimed are defined as follows:

1. A rod and tube actuated thermostatic control and high-limit safety control combination in a single control body comprising; a rod and tube assembly including an expandable tube having a first end portion secured to said body and a second end portion, a relatively non-expandable rod within said tube and having a first end portion extending into said control body and a second end portion operably connected to the second end portion of said tube, a heat sensitive switch beside the outer surface of the second end portion of said tube, said tube having an opening therethrough adjacent the second end portion of said tube, at least one lead wire extending from said switch and through said opening and electrically connected to the safety control, and a cap having a closed end portion positioned to enclose said switch and the second end portion of said tube, and having an open end portion sealingly engaging the periphery of said tube, with said opening located within said cap.

2. The combination defined in claim 1 wherein said opening is through a wall of the tube adjacent the junction of said first and second end portions.

3. The combination defined in claim 1 wherein said tube has a tapered wall portion between said first and second end portions, through which wall portion said opening extends.

4. The combination as defined in claim 1 wherein the closed end portion of said cap is generally oval in cross-section and the open end portion thereof is generally round in cross-section.

5. The combination as defined in claim 1 wherein said operable connection between the second end portions of said rod and tube is a threaded connection and the closed end portion of the cap is close to the second end portion of the tube.

6. The combination as defined in claim 2 wherein the closed end portion of said cap is generally oval in cross-section and the open end portion thereof is generally round in cross-section.

7. The combination as defined in claim 3 wherein the closed end portion of said cap is generally oval in cross-section and the open end portion thereof is generally round in cross-section.

8. The combination as defined in claim 2 wherein said operable connection between the second end portions of said rod and tube is a threaded connection and the closed end portion of the cap is close to the second end portion of the tube.

9. The combination as defined in claim 3 wherein said operable connection between the second end portions of said rod and tube is a threaded connection and the closed end portion of the cap is close to the second end portion of the tube.

References Cited
UNITED STATES PATENTS

| | | | |
|---|---|---|---|
| D. 207,342 | 4/1967 | Dykzeul | 52—7 |
| 2,559,372 | 7/1951 | Rike | 337—394 |
| 2,705,747 | 4/1955 | Strange | 337—394 |
| 2,962,898 | 12/1960 | Burling et al. | 73—362.3 |
| 3,402,886 | 9/1968 | Jackson | 337—394 X |
| 3,412,236 | 11/1968 | Hild et al. | 337—394 X |
| 3,416,118 | 12/1968 | Kimmel | 337—394 |
| 3,235,179 | 2/1966 | Caparone et al. | 236—33 |
| 3,433,411 | 3/1969 | Jackson | 236—21 |

H. B. GILSON, Primary Examiner

U.S. Cl. X.R.

219—412